No. 612,077. Patented Oct. 11, 1898.
W. WHOLTON.
LOCKED BICYCLE SUPPORT.
(Application filed Mar. 31, 1898.)
(No Model.) 3 Sheets—Sheet 1.
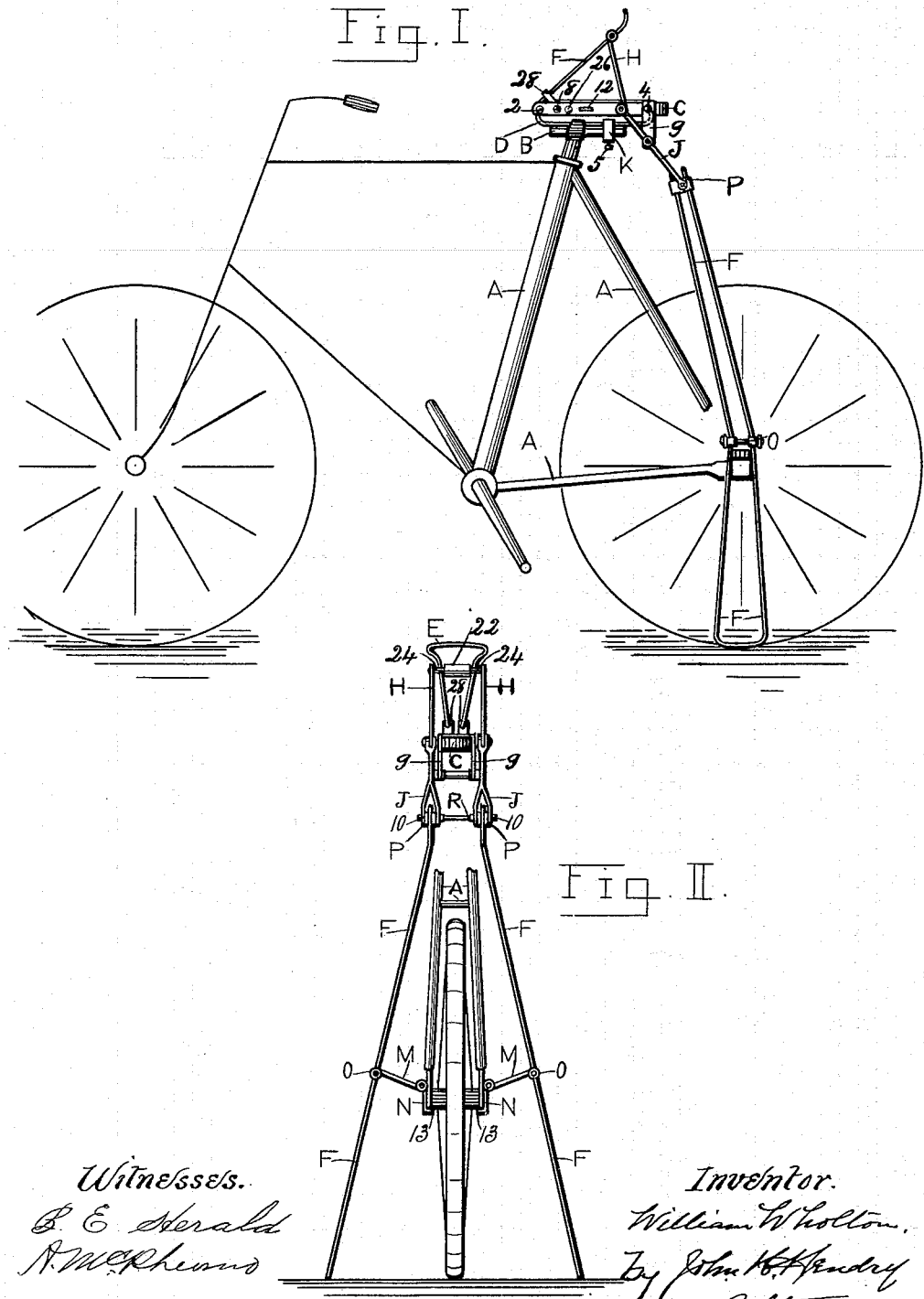

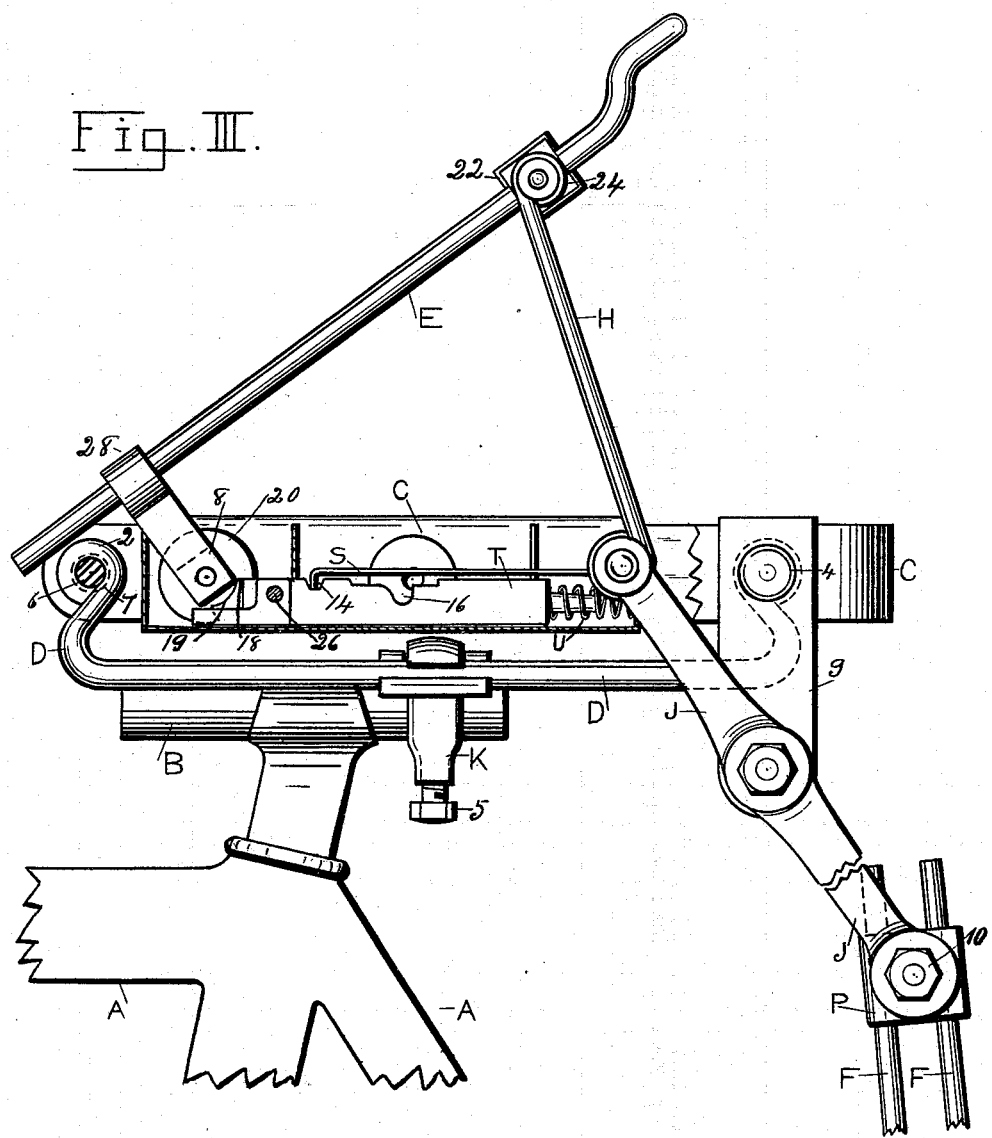

No. 612,077. Patented Oct. 11, 1898.
W. WHOLTON.
LOCKED BICYCLE SUPPORT.
(Application filed Mar. 31, 1898.)
(No Model.) 3 Sheets—Sheet 3.
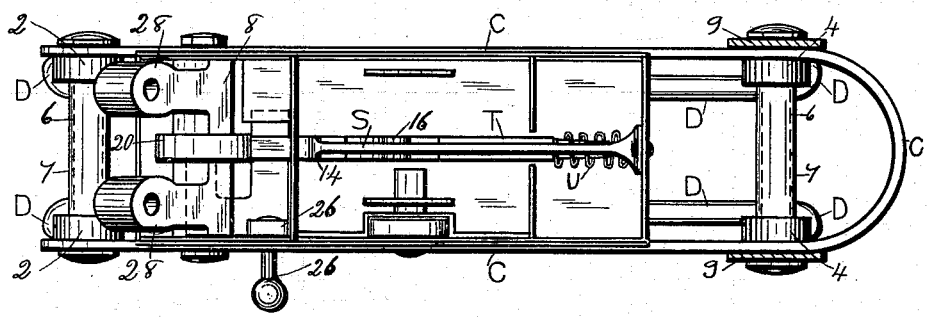
Fig. IV.
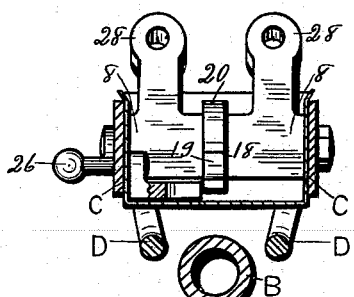
Fig. V.
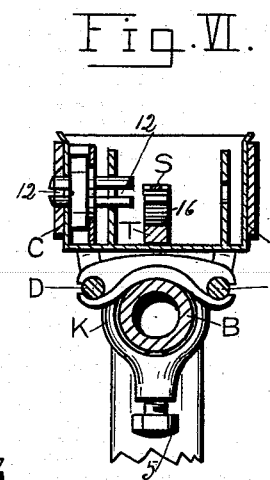
Fig. VI.
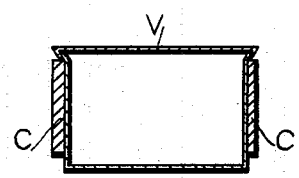
Fig. VII.
Witnesses.
B. E. Herald
A. McPherson
Inventor.
William Wholton
by John H. Hendry
Atty.
THE NORRIS PETERS CO., PHOTO-LITHO., WASHINGTON, D. C.

UNITED STATES PATENT OFFICE.

WILLIAM WHOLTON, OF HAMILTON, CANADA.

LOCKED BICYCLE-SUPPORT.

SPECIFICATION forming part of Letters Patent No. 612,077, dated October 11, 1898.

Application filed March 31, 1898. Serial No. 675,901. (No model.)

*To all whom it may concern:*

Be it known that I, WILLIAM WHOLTON, a citizen of Canada, residing at Hamilton, in the county of Wentworth, in the Province of Ontario, Canada, have invented new and useful Improvements in Locked Steadying Attachments for Bicycles, of which the following is a specification.

My invention consists of a locked steadying attachment for bicycles whereby a bicycle having this device is capable of standing upright and alone on any kind of ground and also capable of being unlocked and free to travel.

This specification, with accompanying drawings, fully discloses the form and the constructive features of my invention, while the claims define the actual scope of the conception.

In the drawings, Figure 1 is a side elevation of the invention, showing the manner and actual position of a bicycle having the steadying attachment adjusted and locked to a standing position. Fig. 2 is an end elevation of the same as viewed from the rear of the bicycle to which this attachment chiefly pertains. Fig. 3 is an enlarged side elevation of the locking device of the bicycle-steadying attachment, partially in section and in position as in Fig. 1. Fig. 4 is a plan of Fig. 3, the bicycle-saddle support, with its side levers and the casing-cover, being removed to show more fully the operating parts of the locking device which is located beneath the saddle. Fig. 5 is a sectional end elevation of the lock and casing, showing the pivotal raised shanks through the broken line X X. Fig. 6 is a sectional end elevation of the lock and casing, showing manner of attachment of said casing to the saddle-bar of a bicycle. Fig. 7 is a sectional end elevation of the lock-casing with slide-cover.

The framework of the bicycle is indicated by A and is provided at its rear upper part with the ordinary adjustable horizontal saddle-bar B, which is the base of support to the bicycle-steadying attachment. The lock-casing C is provided with two horizontal and parallel bars D, which run underneath said casing and adjacent thereto and are secured to the bar B by means of a clip K, provided with set-screw 5. These bars D have curved ends, which are secured to the inner sides of the casing at 2 and at 4 by means of cross-stays 6, which are secured to the sides of the casing by riveting or by nuts, as the case may be, in order to be firm. These stays 6 have each a ferrule 7, which form shoulders for the inner sides of the casing in order to retain said sides in proper parallel condition.

The drawings show the bicycle in standing position. Therefore the rear end of the seat or saddle support E is elevated to an angle on its forward pivot 8 in the casing C and locked in position by means of a key, which operates the locking mechanism in said casing hereinafter described. This saddle-support E is connected to the bicycle-steadying attachment or side rods F by means of the side connecting-rods H and the double side levers J, so that when the said saddle-support E is released—that is, unlocked and brought down to rest upon the casing C—the steadying side rods are brought upward thereby and at a proper distance from the ground, thus releasing the bicycle, which is then free to ride upon.

It will be observed that the double side levers J are pivoted to the lower ends of the side straps 9, which lap over the top of the casing and are secured to the sides thereof by means of the projecting ends of the cross-stay 6, previously mentioned.

The steadying-rods F are attached to that part of the bicycle-frame which is in close proximity to the center of the rear wheel of the bicycle in such a manner as to allow the said rods F to be raised or lowered and at the time of lowering to also spread out from each side of the bicycle. The adjustment of the lower part of these rods F is allowed by means of the side arms M, the inner ends of which are pivoted to the rigid plates N, having under lips 13 in order to afford greater security to said plates, which are attached to the frame. The outer ends of these arms M are pivoted to a bar O, through which passes the double rod F at each side of the bicycle.

It will be noticed that the arms M do not terminate at the central part of their pivots, but terminate below the inner pivots and above the outer pivots in order that the rods F may be allowed to come into closer proximity to the sides of the bicycle when in their raised position—that is, arranged for riding. This feature is important. It will also be observed that the upper ends of these rods F protrude their clip-bearings P, to which the lower ends of the double side levers J are connected, in order to afford facilities for contraction and extension of said rods. These clips P are made in two parts, each said part having two semicircular openings for said rods F, and are supported on the cross-bar R, on the ends of which are the levers J. The said rod R has inner collars for the purpose of receiving and retaining the levers J in position and also to allow for the screwing of the nuts 10 at each end to tighten the divided clips P in order to fasten the upper ends of the rods F in adjusted position.

It has been deemed advisable to have the saddle-connecting rods H constructed in a similar manner to the lower connecting-arms M that the affected parts in connection therewith may operate more freely and come together in closer proximity.

On account of the particular construction of the operating parts the side rods F when brought up are in very close proximity to the sides of the frame, this feature being conducive to the proper appearance of the bicycle and also assists in protecting the coat or the skirts of the rider from the rear wheel.

The clip K, which fastens the lock-casing to the saddle-bar B, previously referred to, allows said casing to have horizontal adjustment without interfering in the least with the general arrangements of the several component parts which go to make up the bicycle standing device, that no matter to what part of the bar B the casing is adjusted the upper ends of the steadying-rods F may be adjusted to suitable position in relation thereto by means described.

The locked position of this device, as shown in the drawings, may be unlocked by inserting the key through aperture 12 inside of lock-casing and giving the key one half-turn forward. The key lifts the forward lip of the spring S out of the notch 14 of the bolt T, and at the same time the lower part of the key engages with the rear end of notch 16 in said bolt, withdrawing the same from engagement with the lip 18, which is formed by the upper part of the recess 19 in the enlarged circular and central part 20 of the forward pivot 8, and allows the upper part of the saddle-support E to be brought down to rest on the upper part of the bent side straps 9, which cross the upper part of the casing. A cushion is formed on this rest by means of a rubber ferrule 22 on the cross-brace 24, which connects the saddle-support E and the side connecting-rods H. In order to retain this saddle-support E in its lowered position for riding, the pin 26, which projects out from the side of the casing, is pushed in and inserts itself against the under lip, which is formed by the other end of the recess 19 in the said central part of the forward pivot 8.

The forward pivot 8 of the saddle-support E has two upper projecting shanks 28, through which extend the fork ends of the saddle-support E securely fastened thereto.

U is a tension-spring to exert a forward force to the lock-bolt. The lock-casing has a slide-cover V, which fits very snugly, as shown, the upper part of the casing being bent slightly outward as side lips, and the cover constructed to conform thereto, thus enabling the cover to slide rearward and not to lift off directly.

Various changes in the form, proportion, and minor details of this invention may be resorted to without departing from the spirit and scope thereof. Hence I do not consider myself limited to the precise construction herein shown, but believe that I am entitled to all such variations as come within the terms of my claims.

What I claim as my invention, and desire to secure by Letters Patent, is—

1. A locked steadying attachment for bicycles of the character described comprising side rods, connected to the bicycle-frame bearing of rear ground-wheel by means of arms, a lock-casing secured to the saddle-bar and capable of horizontal adjustment by means of a clip connected to said bar and to horizontal and parallel bars underneath and secured to said casing, two upper shanks pivoted to forward part of said casing to receive the forward extended fork ends of the saddle-support, side rods connected to said support and to the forward shorter end of the double side levers pivoted to lower extended straps of the casing, rear end of said double levers pivoted to the upper ends of the bicycle-steadying side rods, which are capable of being raised from the ground when the saddle-support is unlocked and brought to riding position, as described.

2. A locked steadying attachment for bicycles of the character described comprising side rods extended at the bottom and connected to lower rear end of frame by means of pivotal arms and the upper contracted ends pivoted to double side levers which are pivoted to side strap of a lock-casing secured to the saddle-bar of the bicycle, horizontal bars located under said casing and secured thereto for attachment to the saddle-bar by means of a clip to afford horizontal adjustment to the lock-casing, a saddle-supporting frame pivoted to forward end of lock-casing by means of raised shanks admitting the fork end of said supporting-frame provided with side rods to connect with the forward ends of the said double side levers and a lock-controlling device in said casing operated by a key to secure the saddle-support in a raised position, hence the side steadying-rods in a lowered position, as described.

3. A lock-casing provided with lower horizontal parallel bars having upper turned ends secured to ferruled cross-bars of said casing, forward pivotal upper shanks to receive the extended fork ends of the saddle-support, an enlarged central part of said pivot having recess for forward end of the bolt to enter and lock the same by means of the spiral spring on the rear shank of the bolt, to press against the shoulder thereof, thus retaining the saddle-support in its upper inclined position, hence the connected steadying side rods in their lowered position to hold the bicycle upright, as described.

4. A lock-casing provided with lower horizontal parallel bars with upturned ends secured to ferruled cross-bars at the sides of the casing, forward pivotal shanks, their upper parts receiving the fork ends of the saddle-support, the enlarged central part of the pivotal shanks having a recess to receive the forward end of the lock-bolt to lock the said pivotal shanks, a tension-spring to press the lock-bolt forward and retain the same, hence the saddle-support in upper inclined position and the steadying side rods connected thereto in lower position and locked, a key capable of disengaging the upper spring from the notch in the lock-bolt, and forcing the same rearward from the recess that is in the said enlarged part of the pivotal shanks, to unlock the saddle-support, and allow the rubber ferrule of the same to rest on the lock-casing, and to raise the side steadying-rods a suitable distance from the ground and in proximity to the sides of the frame for riding purposes, as described.

5. In a bicycle of the character described, a lock-casing, secured to the saddle-bar of a bicycle and capable of horizontal adjustment, a saddle-support pivotally attached to the forward part of said casing by means of its forked ends extending through upper shanks of the saddle-support pivot having central enlargement with recess to receive a pin to engage with the lower shoulder formed by said recess to prevent the raising of the saddle-support, hence the lowering of the side steadying-rods by means of the mechanism described.

6. A standing device for bicycles of the character described, consisting of double side rods widened out at the base and connected to the frame of a bicycle at the central part of the rear wheel by pivotal arms, capable of spreading said rods out at lowering, and bringing the same in at raising, the upper part of the said side rods adjustably connected to double side levers, pivoted to a lower side extended strap of the lock-casing, horizontally and adjustably connected to the saddle-bar of a bicycle, the forward fork ends of a saddle-support extending through and secured to the upper pivotal shanks at the forward part of said casing, side rods connected to the rear part of the saddle-support and to the forward ends of the said double levers, and controlled and locked by mechanism in said casing, as described.

7. A standing device for bicycles of the character described, comprising double side rods widened out at the base and connected to the frame of a bicycle at the central part of the rear wheel by pivotal arms, capable of spreading said rods out at lowering, and bringing the same in at raising, the upper part of the said side rods, adjustably connected to double side levers, pivoted to a lower side extended strap of the lock-casing, horizontally and adjustably connected to the saddle-bar of a bicycle, said casing having upper side projections, and cover having side flanges to conform with said projections to slide thereon, a saddle-support with its forward fork ends extending through and secured to the upper pivotal shanks at the forward part of said casing, side rods connected to the rear part of the saddle-support and to the forward ends of the said double levers, and controlled and locked by mechanism in said casing, as described.

8. A standing device for bicycles consisting of double side rods widened out at the base, and connected to the frame of a bicycle near the central part of the rear wheel by pivotal arms, clips at the upper ends of each rod to clip the same, the clips inserted in the openings of the double side levers, and capable of being tightened or loosened by means of a nut on each lever to screw against a cross-piece between the levers, the inner side of said lever pressing against the clips to bind them to the rods, as described.

9. A bicycle lock and stand-support, consisting of double side rods widened out at the base and connected to the frame by means of double side arms, at the central part of the rear wheel, the upper ends of the rods connected to double side levers by means of clips to clip the upper end of said rods by the inner side of the levers pressing against the clips by means of nuts and a cross-bar, the levers pivoted to the lower end of the strap, side rods connected to the other end of levers and the saddle-support, a cross-bar on saddle-support provided with a rubber ferrule to rest on the lock-casing, pivotal shanks at the forward part of said casing, which the forward fork ends go through and are secured thereto, as described.

10. A lock-casing provided with lower horizontal parallel bars having upper turned ends secured to ferruled cross-bars of said casing, forward pivotal upper shanks to receive the extended fork ends of the saddle-support having a cross-bar which is provided with a rubber ferrule for the saddle-support to rest on the lock-casing, the forward end of the lock-bolt to enter in recess of the enlarged central part of said pivotal shanks, and lock the same, by means of the spiral spring on the rear shank of the bolt to press against the shoulder thereof, thus retaining the saddle-support in its upper inclined position, hence the connected steadying side rods in their lowered position to hold the bicycle upright, as described.

11. A lock-casing and steadying device consisting of double side rods which are widened at the base, and connected to the frame, at the central part of the rear wheel by double side arms, the upper end of said rods to be adjusted by means of clips, which fasten in the double side levers, side rods of which their upper ends are pivotally connected to the rubber-ferruled cross-bar, their lower ends pivotally connected to the double side levers, the forward part of the saddle-support to be secured to the forward and upper pivotal shanks, as described.

12. A lock-casing consisting of a forward pivot having upper shanks with sockets to receive forward part of the saddle-support and secure thereto, said pivot having an enlarged central part with recess for a bolt to enter and held in the recess by means of a spiral spring, holding the saddle part in inclined position, means to withdraw the bolt from said recess, and allowing the saddle-support to rest on the casing, and a pin to engage with said recess, the lock-casing provided with a cover which has flanges to engage with upper flanges at central part of the lock-casing, as described.

13. A locked steadying attachment consisting of double side rods widened at the base, connected to plates on the bicycle-frame, at the central part of the rear wheel by means of double side arms which are bent around the cross-bar of double side rods and around a part of said plate in opposite directions, clips at the ends of double side levers held by nuts to clip the upper ends of said rods, side rods connected to the other ends of side levers and the rubber-ferruled cross-bar on saddle-support, said side rods being bent around their connections in opposite directions, as described.

14. A lock and stand comprising a lock-casing having upper flanges to engage with the flanges of the cover to slide thereon, pivotal shanks with the forward part of the saddle-support connected thereto, the shanks capable of holding the saddle-support in inclined position by a bolt, or held horizontally on the casing by a pin, which lower and widen and raise and contract the double side rods by lever connections and double side arms, as described.

15. In a bicycle, having double side rods widened out at the base, their upper ends connected to the ends of double side levers pivoted at the lower ends of the side straps, side rods connecting the saddle-support and the outer ends of double side levers, the rods to be bent around their connections in opposite directions and clip the same, the double side rods connected to the frame by double side arms which fasten to cross-bar of double side rods and to plates on the frame, said arms to be bent around their connections in opposite directions and clip the same, as described.

In witness whereof I have hereunto set my hand in presence of two witnesses.

WILLIAM WHOLTON.

Witnesses:
JOHN H. HENDRY,
B. E. HERALD.